(12) United States Patent
Matsuura

(10) Patent No.: US 7,494,493 B2
(45) Date of Patent: Feb. 24, 2009

(54) ANIMAL TATTOOING APPARATUS AND PROCEDURE THEREOF

(76) Inventor: Grace Masako Matsuura, 5735 Calle Vista Alegre, Yorba Linda, CA (US) 92887

(*) Notice: Subject to any disclaimer, the term of this patent is extended or adjusted under 35 U.S.C. 154(b) by 668 days.

(21) Appl. No.: 10/834,282

(22) Filed: Apr. 28, 2004

(65) Prior Publication Data
US 2004/0220586 A1 Nov. 4, 2004

(51) Int. Cl.
*A61B 17/00* (2006.01)
(52) U.S. Cl. .................................. 606/116
(58) Field of Classification Search ............ 606/116, 606/117, 133, 132, 181–189, 205–210, 131, 606/134
See application file for complete search history.

(56) References Cited

U.S. PATENT DOCUMENTS

| 699,915 A | * | 5/1902 | Foultz | 606/186 |
| 4,488,550 A | * | 12/1984 | Niemeijer | 606/116 |
| 5,972,021 A | * | 10/1999 | Huttner et al. | 606/210 |
| 6,551,338 B1 | * | 4/2003 | Chiu et al. | 606/186 |

* cited by examiner

Primary Examiner—Kevin T Truong
(74) Attorney, Agent, or Firm—NovaTech IP Law

(57) ABSTRACT

A tattooing apparatus for marking animals includes a "U" shaped pliers and a disposable needle carrier that contains plurality of needles that are arranged in desired patterns to be pressed onto animals tissue using tattoo ink. The needle carrier is made of one-piece molded part that can quickly connect into the opening of pliers handle by means of snug fit to be used for purpose of animal tattooing.

2 Claims, 2 Drawing Sheets

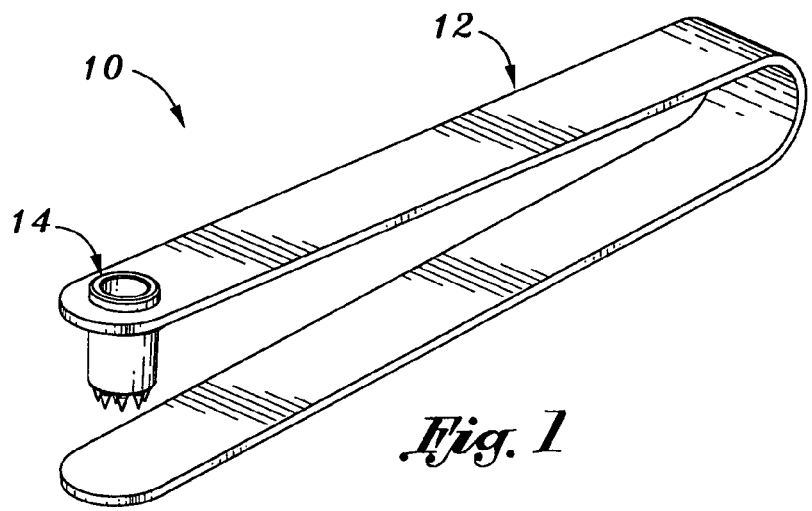
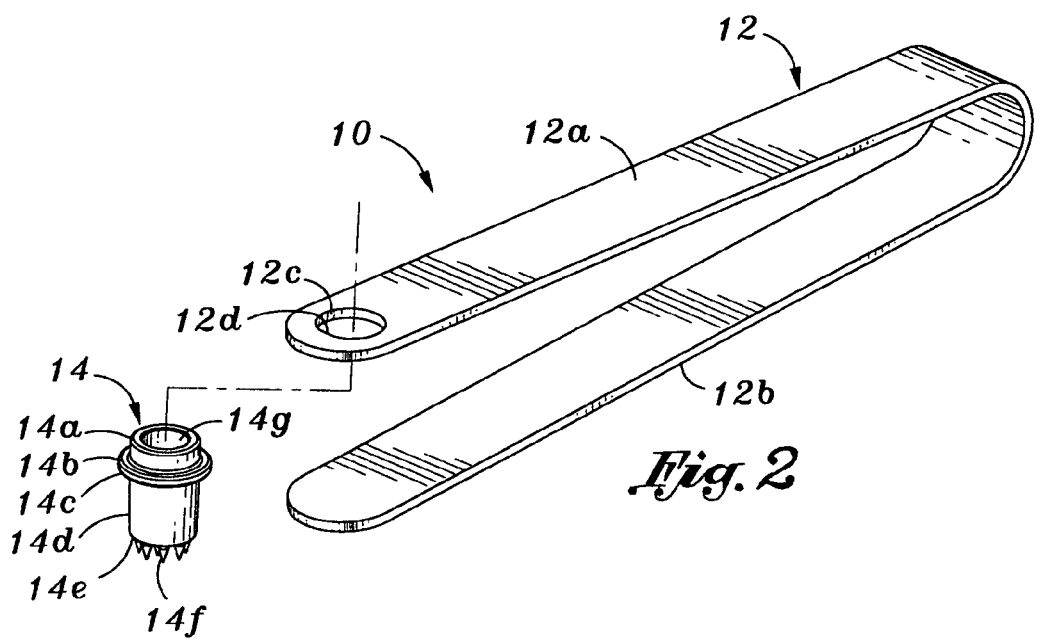
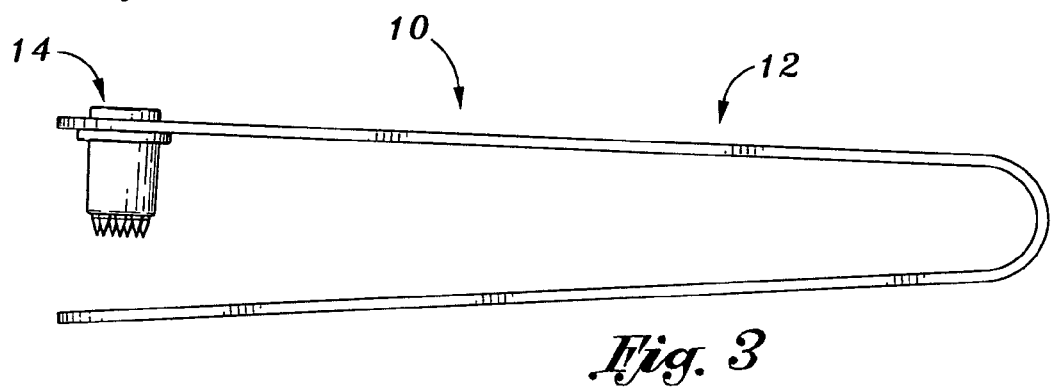

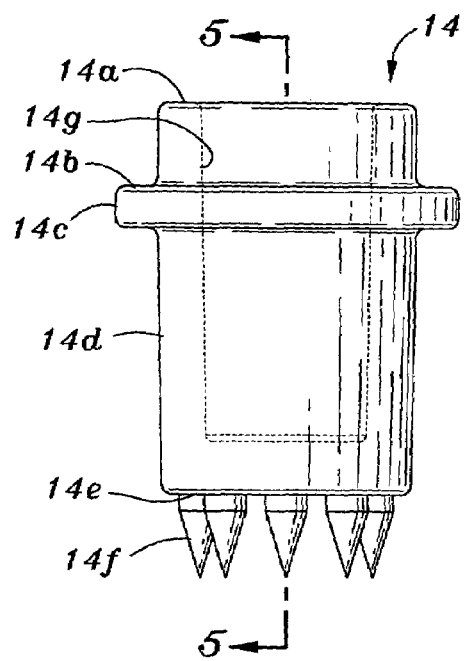
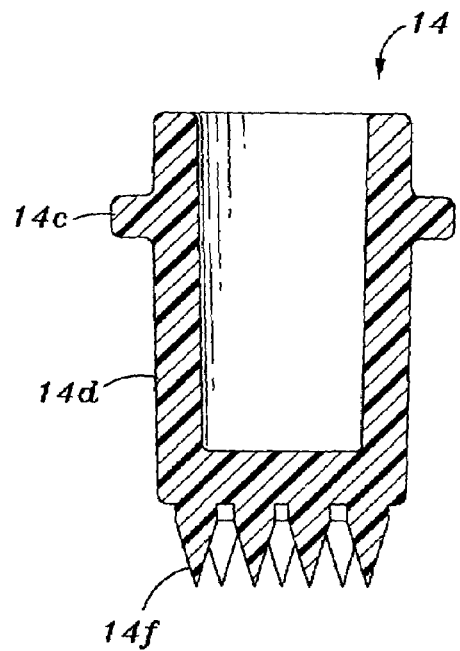
Fig. 4    Fig. 5
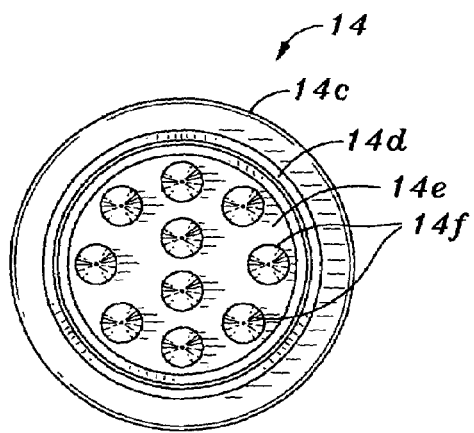
Fig. 6

ANIMAL TATTOOING APPARATUS AND PROCEDURE THEREOF

FIELD OF THE INVENTION

The present invention relates to animal tattooing devices with needle carrier assembly. More particularly, this invention relates to a tattooing device with a unitary disposable needle carrier that includes a set of solid needles at the bottom end for purpose of animal tattooing.

BACKGROUND OF THE INVENTION

Identification marks on animal's skin such as animal ears are provided by tattooing devices to identify surgically sterilized animals. Most tattoo devices inject tattoo ink into tissue using at least one hollow needle to permanently create the mark. Tattooing devices are disclosed in some prior art inventions, such as U.S. Pat. No. 4,392,493 by Niemeijer et al, entitled "Tattooing Apparatus" which describes "A tattooing apparatus is provided with at least one needle carrier with arrangement of needles by which at least a number of the needles mutually arranged according to a program of symbols and in such a manner that the tissue to be tattooed can be pierced by the free ends of the needles. Each of the needles is hollow and is provided with outlet opening close to its free end for feeding a contrasting fluid into the perforation in the tissue."

In spite of the advantages in prior art, there are some disadvantages and limitations that can not be delivered with respect to applying tattoo ink into tissue via injection using hollow needles.

However, this invention overcomes the shortcomings of prior art devices and provides a simplified design of a needle carrier to be used in animal tattooing by pressing plurality of solid needles onto the animal tissue to provide marks at lower cost to users.

SUMMARY OF THE INVENTION

It is an object of the present invention to provide a tattooing apparatus for marking animals. This device includes "U" shaped pliers and a disposable needle carrier that contains plurality of needles which are arranged in desired patterns. The needle carrier is made of one-piece molded part that can quickly connect into the opening of pliers handle by means of snug fit to be used for purpose of animal tattooing.

It is further object of the present invention to provide tattooing procedure that can quickly creates animal markings in fewer steps with respect to tattooing apparatus of this invention. The procedure begins by applying a small amount of tattoo ink to the inside of the right ear of animal to cover an area of approximately 0.5 cm radius, then pressing tattooing needles onto tissue via tattooing pliers within the applied ink area, after removing tattooing apparatus away from the tissue, wiping away excess ink from animal's ear.

Further objects and advantages of this invention will become apparent from consideration of the drawings and description that follows.

BRIEF DESCRIPTION OF THE DRAWINGS

Exemplary embodiments of the invention will now be described in conjunction with the drawings in which:

FIG. 1 is a perspective view of the present invention showing an assembled tattooing apparatus.

FIG. 2 is an exploded view of tattooing apparatus of FIG. 1.

FIG. 3 is a side view of FIG. 1.

FIG. 4 is a side view of needle carrier.

FIG. 5 is a cross sectional view taken along line 5-5 in FIG. 4.

FIG. 6 is a bottom view of needle carrier.

DETAILED DESCRIPTION OF THE INVENTION

FIG. 1 illustrates an assembled view of a tattooing device 10 that includes a "U" shaped pliers 12 and a needle carrier 14. Pliers 12 has retractable handles 12a, 12b for purpose of applying force onto the animal tissue using needle carrier 14 which is a cylindrical in shape 14d that has upper end 14a and bottom end 14f as shown in FIG. 2-6. Needle carrier also contains a collar 14c with top surface 14b as means to limit insertion of needle carrier 14 into the opening 12d via a hole thru 12c at the end of pliers handle 12a. On the bottom surface 14e of the needle carrier 14 there is plurality of solid needles 14f, which are arranged in desired patterns for applying the tattoo mark onto tissue. The needle carrier 14 is made of one-piece molded rigid medical grade plastic part that can quickly connect into the opening 12d of pliers handle by means of snug fit or any type of snap on feature to be used for purpose of animal tattooing. The present invention also teaches tattooing procedure that can quickly create animal markings in fewer steps with respect to tattooing apparatus of this invention. The procedure begins with applying small amount of tattoo ink to the inside of the right ear of animal to cover an area of approximately 0.5 cm radius, then pressing tattooing needles onto tissue via tattooing pliers within the applied ink area, after removing tattooing apparatus away from the tissue, final step is to wipe off excess ink from animal's ear. After wiping excess ink, the tattoo mark is visible and identification mark is made in simple steps without injecting fluid into animal tissue.

While this invention is susceptible of embodiments in many different forms, this specification and the accompanying drawings disclose only some specific forms as examples of the invention. The invention is not intended to be limited to the embodiments so described. However, the scope of the invention is pointed out in the appended claims.

I claim:

1. Tattooing apparatus for marking animals comprising:
   a pliers, said pliers having unitary "U" shaped retractable handles, said handles having rounded ends and an opening in one of the ends of said handles; and
   a removable needle carrier of one-piece construction, said needle carrier having a cylindrical body and having a plurality of solid needles disposed on a bottom end thereof, said plurality of solid needles being arranged in one of a plurality of desired patterns for the purpose of tattooing animal tissue, said solid needles being non-movable relative to the cylindrical body, said needle carrier being sized and configured to removably engage said opening with a snug fit into said opening, the needle carrier having a collar on the cylindrical body, the collar being configured to limit insertion of the needle carrier into the opening.

2. Tattooing apparatus for marking animals according to claim 1, wherein said needle carrier is molded of rigid medical grade plastic.

* * * * *